(12) United States Patent
Morota et al.

(10) Patent No.: US 6,919,921 B1
(45) Date of Patent: Jul. 19, 2005

(54) CAMERA CONTROL USING SCROLL BAR FOR TILT CONTROL AND HAVING DISPLAY OF TILTING DIRECTION AND CONTROLLABLE RANGE INFORMATION

(75) Inventors: Masayuki Morota, Kawasaki (JP); Koichiro Tanaka, Yokohama (JP); Hiroki Yonezawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/088,217

(22) Filed: Jun. 1, 1998

(30) Foreign Application Priority Data

Jun. 10, 1997 (JP) .............................................. 9-152307

(51) Int. Cl.⁷ .......................... H04N 5/232; H04N 7/14; H04N 7/18; G06F 11/00
(52) U.S. Cl. ................................ 348/211.11; 348/14.03; 348/14.07; 348/159; 348/211.8; 348/211.13; 348/153; 348/143; 702/188
(58) Field of Search ....................... 348/211.11, 211.8, 348/211.13, 14.03, 14.07, 159, 153, 143; 702/188

(56) References Cited

U.S. PATENT DOCUMENTS

| | | | | |
|---|---|---|---|---|
| 5,793,367 A | * | 8/1998 | Taguchi | 348/14.02 |
| 5,825,432 A | * | 10/1998 | Yonezawa | 348/143 |
| 6,002,995 A | * | 12/1999 | Suzuki et al. | 428/343 |
| 6,101,536 A | * | 8/2000 | Kotani et al. | 348/143 |
| 6,137,485 A | * | 10/2000 | Kawai et al. | 348/143 |
| 6,208,376 B1 | * | 3/2001 | Tanaka et al. | 345/719 |
| 6,208,379 B1 | * | 3/2001 | Oya et al. | 348/211 |
| 6,266,082 B1 | * | 7/2001 | Yonezawa et al. | 348/211 |
| 6,271,805 B1 | * | 8/2001 | Yonezawa | 345/733 |
| 6,337,709 B1 | * | 1/2002 | Yamaashi et al. | 348/143 |

FOREIGN PATENT DOCUMENTS

| | | | | |
|---|---|---|---|---|
| EP | 0 715 453 | | 6/1996 | |
| JP | 06-205409 | * | 7/1994 | H04N/7/14 |

OTHER PUBLICATIONS

Patent Abstracts of Japan JP 08 154197 A, published Jun. 11, 1996, vol. 096, No. 010.

* cited by examiner

*Primary Examiner*—Wendy R. Garber
*Assistant Examiner*—James M. Hannett
(74) *Attorney, Agent, or Firm*—Cowan, Liebowitz & Latman, P.C.

(57) ABSTRACT

A camera control system is arranged to improve operability of at least a camera or each of a plurality of cameras for panning and tilting control over the camera by permitting simultaneous confirmation of the photo-taking postures of the camera in the direction of tilting as well as in the direction of panning. The operability is improved by arranging a tilt control panel to be displayed to permit control in the tilting direction of the camera when a camera icon indicative of the camera is selected on a map displayed at a monitor.

33 Claims, 12 Drawing Sheets

CAMERA CONTROL USING SCROLL BAR FOR TILT CONTROL AND HAVING DISPLAY OF TILTING DIRECTION AND CONTROLLABLE RANGE INFORMATION

BACKGROUND OF THE INVENTION

1. Field of the Invention

The present invention relates to a camera control system, etc., adapted for a surveillance camera or a video conference system which is communicating information, for example, through a network.

2. Description of Related Art

A remote surveillance system using a plurality of cameras has heretofore been arranged to use several video cameras, to obtain analog video signals from these video cameras and to supply the analog video signals to a plurality of monitors arranged at a managing apparatus. The remote surveillance system of this kinds has been used within a relatively small building.

Meanwhile, a larger remote surveillance system in which a plurality of cameras are connected to a LAN (local area network) or a public digital network such as an ISDN (integrated services digital network) has been developed to permit a greater number of cameras including cameras located at far distances to be connected to the system.

Camera control systems capable of controlling the cameras of such a remote surveillance system through a network include a camera control system which is arranged to enable each camera operating terminal to display images and to perform camera control through a GUI (graphical user interface) operation by utilizing an apparatus such as a personal computer or a workstation.

An advantage of the above-stated camera control system lies in that the camera control system enables any person who is unaccustomed to the apparatus to easily handle the apparatus. The operability of the camera control system can be enhanced particularly by arranging the camera control system to simultaneously show a display on a monitor of an image picked up by a camera and also a camera control panel provided for control over the camera from which the image is outputted.

Another advantage of the camera control system lies in that a plurality of cameras connected to the network can be visually controlled by using a map which shows thereon allocations of the cameras and camera icons indicative of the image pickup directions of the cameras.

However, the map showing the allocations of the cameras and the camera icons have been arranged to show the cameras only in a state of being viewed from above. The conventional camera control system is, therefore, not usable for controlling the postures of the cameras in the tilting directions, though it permits control in the panning directions of the cameras.

BRIEF SUMMARY OF THE INVENTION

The invention is directed to the solution of the above-stated problem of the conventional camera control system. An object of the invention is, therefore, to provide a camera control system which permits control over the posture of a camera in the direction of tilting as well as in the direction of panning, by using a flatly drawn map and camera icons shown on the map.

To attain the above object, in accordance with an aspect of the invention, there is provided a camera control system capable of selectively controlling an image pickup direction of at least one camera connected to the camera control system through a network, which comprises map display means for displaying a map, first camera index display means for displaying a first camera index indicative of a position of the camera in a state of being superimposed on the map displayed by the map display means, and second camera index display means for displaying a second camera index indicative of a state of a current tilting direction of the camera in relation to the first camera index displayed by the first camera index display means.

Further, to attain the above object, in accordance with another aspect of the invention, there is provided a control method for a camera control system capable of selectively controlling an image pickup direction of at least one camera connected to the camera control system through a network, which comprises a map display step of displaying a map, a first camera index display step of displaying a first camera index indicative of a position of the camera in a state of being superimposed on the map displayed by the map display step, and a second camera index display step of displaying a second camera index indicative of a state of a current tilting direction of the camera in relation to the first camera index displayed by the first camera index display step.

Further, to attain the above object, in accordance with a further aspect of the invention, there is provided a storage medium which stores therein a program for operating functions of a camera control system capable of selectively controlling an image pickup direction of at least one camera connected to the camera control system through a network, the program comprising processes of displaying a map, displaying a first camera index indicative of a position of the camera in a state of being superimposed on the map displayed, and displaying a second camera index indicative of a state of a current tilting direction of the camera in relation to the first camera index displayed.

The above and other objects and features of the invention will become apparent from the following detailed description of an embodiment thereof taken in connection with the accompanying drawings.

BRIEF DESCRIPTION OF THE SEVERAL VIEW OF THE DRAWING

Figure 13A:
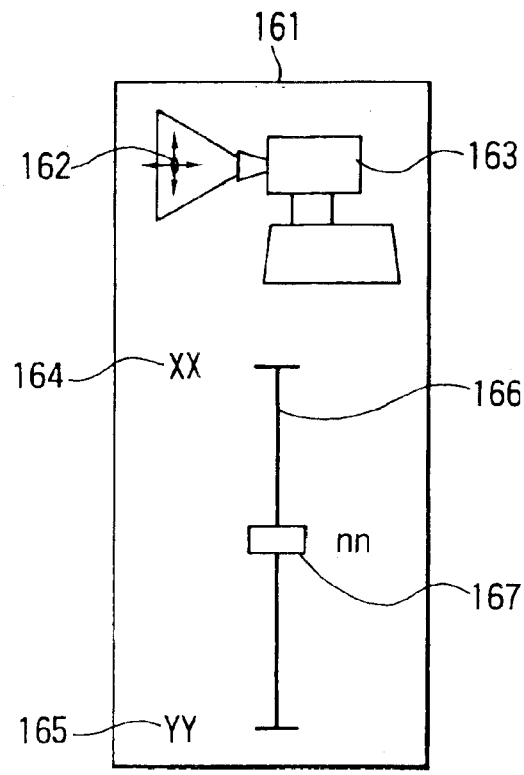
Figure 13C:
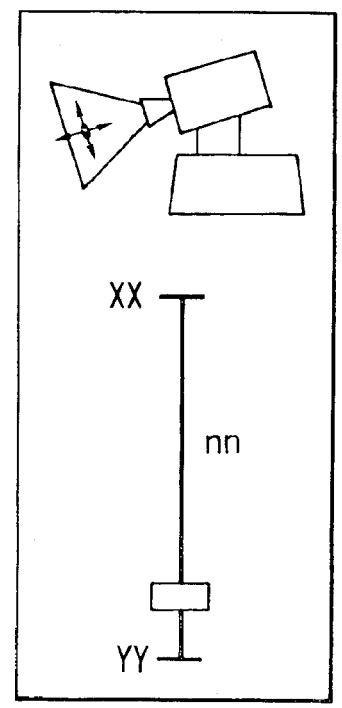
Figure 13B:
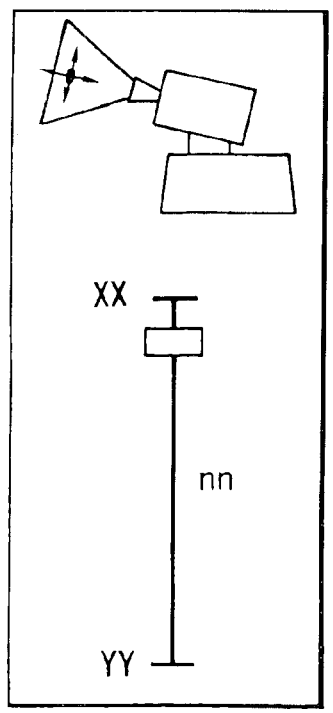

FIGS. 13(a), 13(b) and 13(c) show examples of display made on a tilt display panel.

Figure 14:
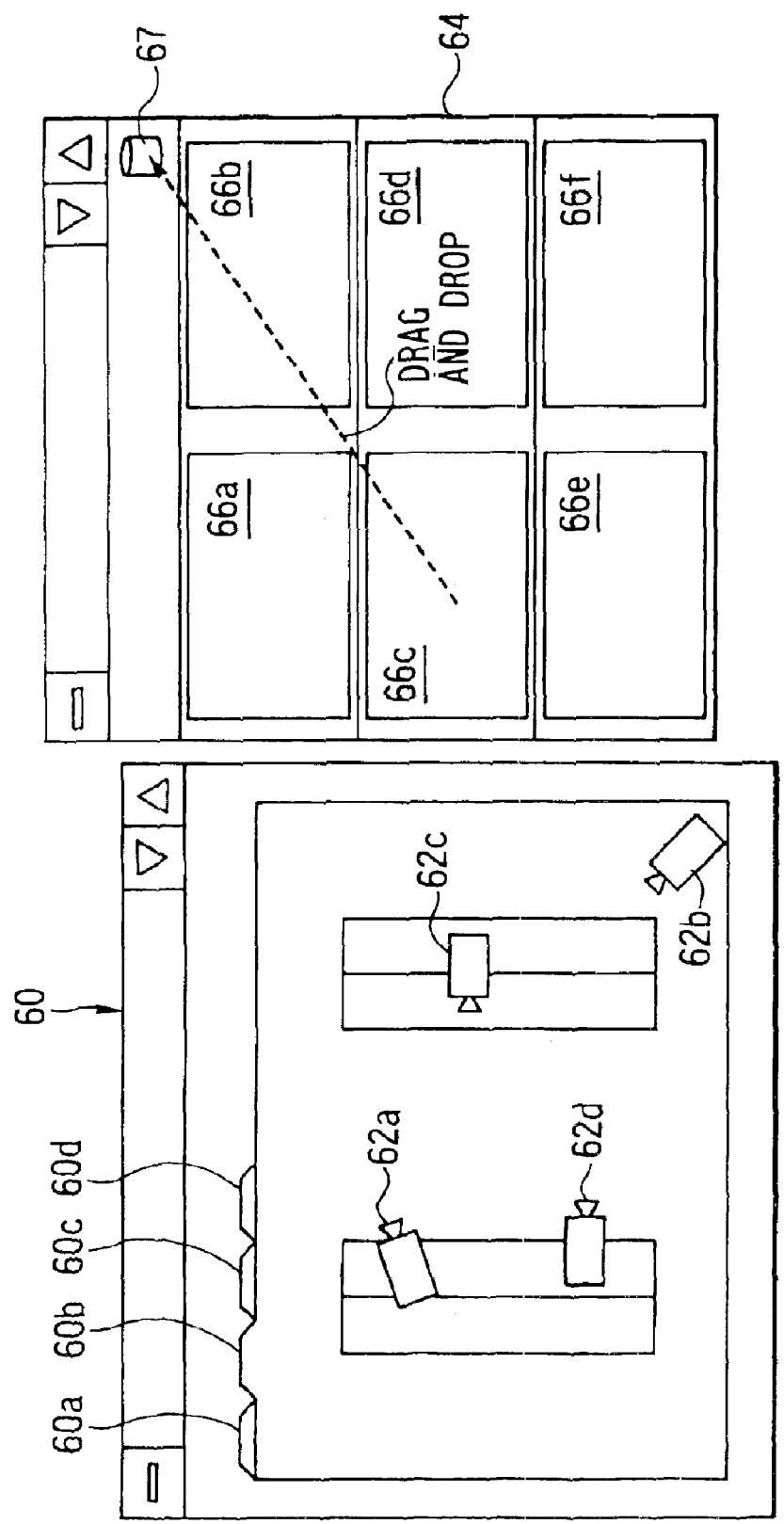

FIG. 14 shows an example of display made on the monitor image plane of the image receiving terminal 18.

DETAILED DESCRIPTION

Hereinafter, a preferred embodiment of the invention will be described in detail with reference to the drawings.

Figure 1:
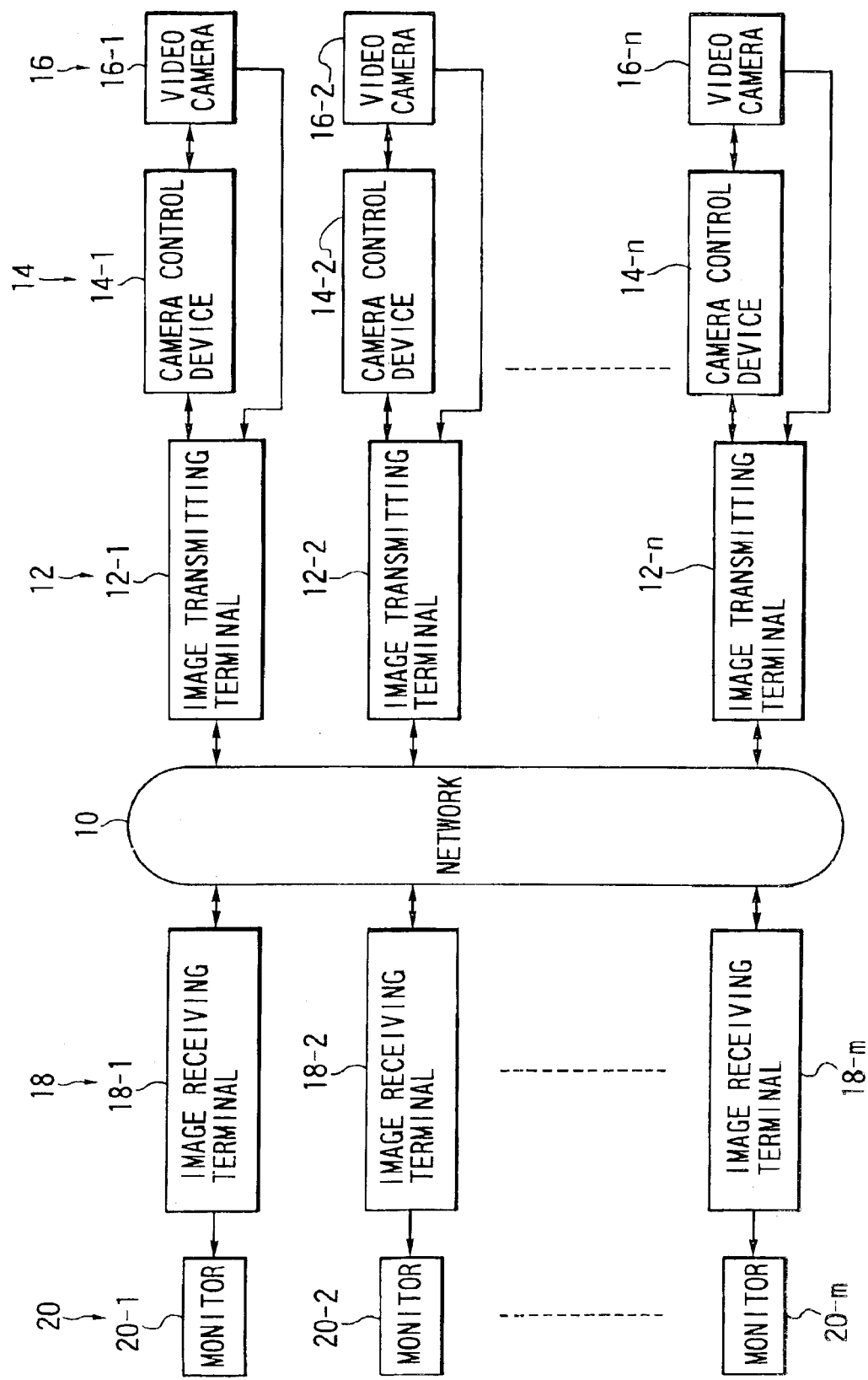
FIG. 1 is a block diagram showing the arrangement of a camera control system.

FIG. 1 is a block diagram showing in outline the arrangement of a camera control system according to the embodiment of the invention. A network 10 is arranged to digitally transmit image data and camera control information (including status information). An "n" number of image transmitting terminals 12 (12-1 to 12-n) are connected to the network 10. Each of the image transmitting terminals 12 (12-1 to 12-n) is composed of an information processing terminal such as a computer or the like.

Each of video cameras 16 (16-1 to 16-n) is connected to one of the image transmitting terminals 12 (12-1 to 12-n) through one of camera control devices 14 (14-1 to 14-n). Each of the camera control devices 14 (14-1 to 14-n) is arranged to control panning, tilting, zooming, focusing and an apparatus to one of the video cameras 16 connected thereto, in accordance with a control signal from a corresponding one of the image transmitting terminals 12 (12-1 to 12-n).

Each of the video cameras 16 (16-1 to 16-n) receives supply of power from one of the camera control devices 14 (14-1 to 14-n). Each of the camera control devices 14 (14-1 to 14-n) is arranged to control turning-on or turning-off of the power supplied to the video camera 16, in accordance with a control signal coming from outside.

Further, Image receiving terminals 18 (18-1 to 18-m) which are arranged to receive image information sent out to the network 10 from the image transmitting terminals 12 (12-1 to 12-n) and to display the image information received are also connected to the network 10. Monitors 20 (20-1 to 20-m) each of which is composed of a bit-mapped display or a CRT (cathode-ray tube) are connected respectively to the image receiving terminals 18 (18-1 to 18-m).

The network 10 does not have to be a wire network but may be a wireless network using a wireless LAN device or the like. In the event of such a wireless network, each of the image receiving terminals 18 can be integrated with the monitor 20 into a portable-type image receiving terminal.

Each of the image transmitting terminals 12 is arranged to compress an image signal outputted from the camera 16 in accordance with a predetermined compression method, such as H.261, and to send the compressed image signal via the network 10 to an image receiving terminal 18 requesting the image or to all of the image receiving terminals 18. Each of the image receiving terminals 18 is capable of controlling turning-on or turning-off of the supply of power as well as various parameters, such as a photo-taking direction, a photo-taking magnification, focus, an aperture, etc., through the network 10, the image transmitting terminal 12 and the camera control device 14.

Each of the image transmitting terminals 12 may have a monitor connected thereto and may be provided with an image expanding device for expanding a compressed image, so that the image transmitting terminal 12 can be used also as an image receiving terminal. Meanwhile, each of the image receiving terminals 18 may have the camera control device 14 and the video camera 16 connected thereto and may be provided with an image compressing device, so that the image receiving device 18 can be used also as an image transmitting terminal. Each of these terminals is provided with a ROM which stores therein some software that is necessary for transmitting or receiving images.

Figure 2:
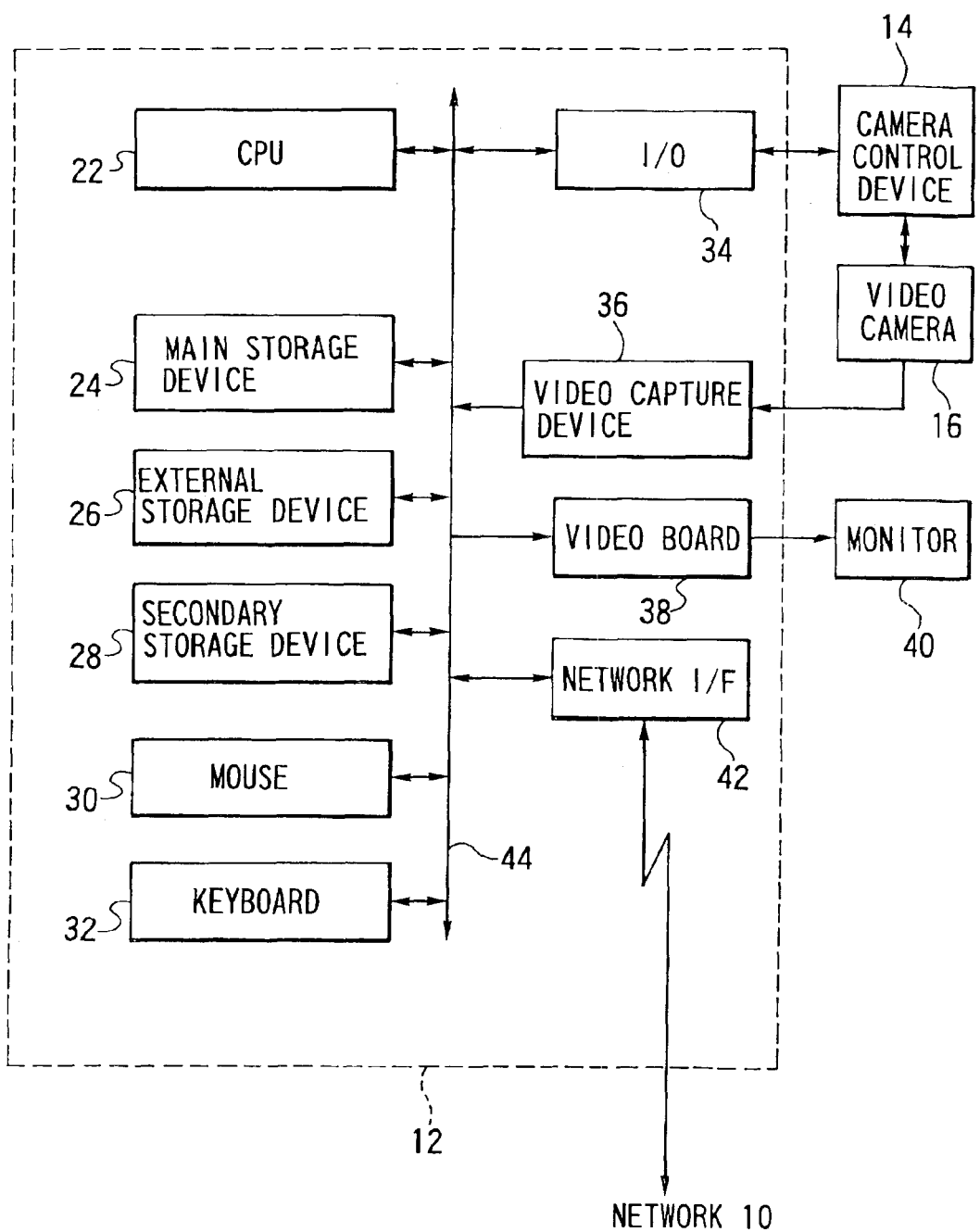
FIG. 2 is a block diagram showing the arrangement of an image transmitting terminal.

FIG. 2 is a block diagram showing in outline the arrangement of each image transmitting terminal 12. The image transmitting terminal 12 is provided with a CPU 22 which is arranged to perform overall control for the whole image transmitting terminal 12, a main storage device (RAM) 24, a detachably-mountable external storage device 26 such as a floppy disk or a CD-ROM, a secondary storage device 28 such as a hard disk, a mouse 30 which serves as a pointing device, a keyboard 32, an I/O board 34 which is connected to the camera control device 14 to receive camera control signals, and a video capture device 36 which is arranged to take in a video signal outputted from the video camera 16.

The video capture device 36 in the embodiment has an A/D converting function to convert an analog video signal into a digital signal and an image compressing function to compress image information. A video board 38 is arranged to display image information on a monitor 40. Reference numeral 42 denotes a network interface. A system bus 44 is arranged to interconnect the component elements 22 to 38 and 42. Further, in a case where the image transmitting terminal 12 is arranged to be used only for image transmission, the video board 38 and the monitor 40 may be omitted.

With the embodiment arranged as described above, the image transmitting terminal 12 transmits an image signal via the network 10 to the image receiving terminal 18 which is located at a remote place, and also receives a camera control signal from the image receiving terminal 18. Upon receipt of the camera control signal, the image transmitting terminal 12 performs control over a panning or tilting action or the like of the camera 16.

Figure 3:
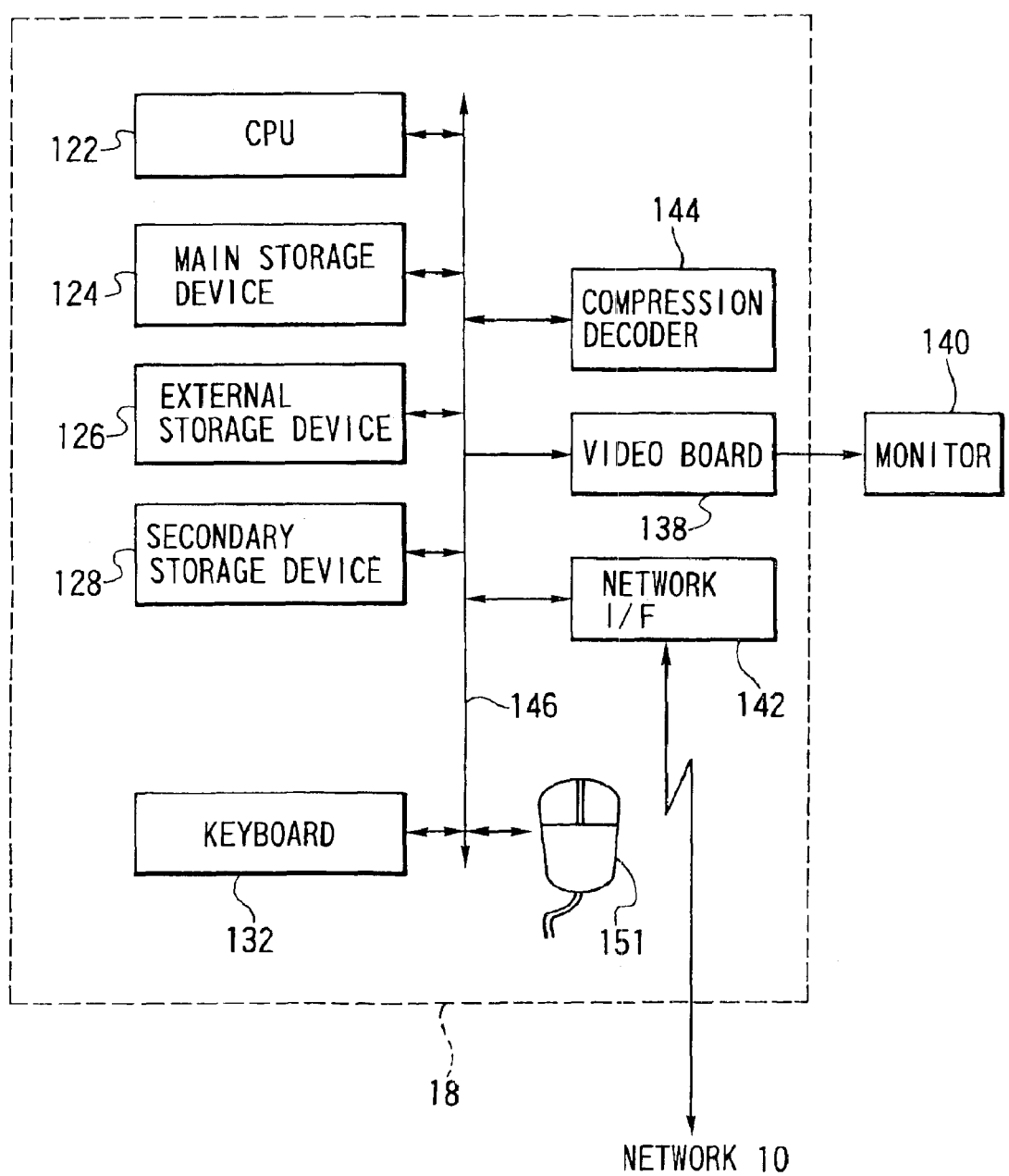
FIG. 3 is a block diagram showing the arrangement of an image receiving terminal.

FIG. 3 is a block diagram showing in outline the arrangement of each image receiving terminal 18 which is composed of an information processing terminal such as a computer or the like. Referring to FIG. 3, a CPU 122 is arranged to perform control for the whole image receiving terminal 18. The image receiving terminal 18 includes a main storage device (RAM) 124, a detachably-mountable external storage device 126 such as a floppy disk or a CD-ROM, a secondary storage device 128 such as a hard disk, a keyboard 132, a mouse 151 which serves as a pointing device, a video board 138 which is arranged to display image information on a monitor 140, a network interface 142, a compression decoder 144 arranged to expand compressed image information, and a system bus 146 which is arranged to interconnect the component elements of the image receiving terminal 18. The mouse 151 is provided with click buttons which are disposed on its right and left sides, as shown in FIG. 3.

The arrangement of the image receiving terminal 18 is identical with that of the image transmitting terminal 12, shown in FIG. 2, except that the image receiving terminal 18 is provided with the decoder 144 which is arranged to expand a compressed image, and the software of the image receiving terminal 18 differs from that of the image transmitting terminal 12. Therefore, the details of the image receiving terminal 18 are omitted from the following description. Further, if the image receiving terminal 18 is provided with the software of the image transmitting terminal 12, a video output signal can be transmitted from the image receiving terminal 18 to other video receiving terminals 18.

The image receiving terminal 18 sends a camera control signal to the image transmitting terminal 12. The image transmitting terminal 12 which receives the camera control signal controls the camera 16 according to the camera control signal and then sends information on the current state of the camera 16 back to the image receiving terminal 18. Upon receipt of the image data from the image transmitting terminal 12, the image receiving terminal 18 processes the image data in a predetermined manner and displays a picked-up image on the monitor 140 in real time.

Figure 4:
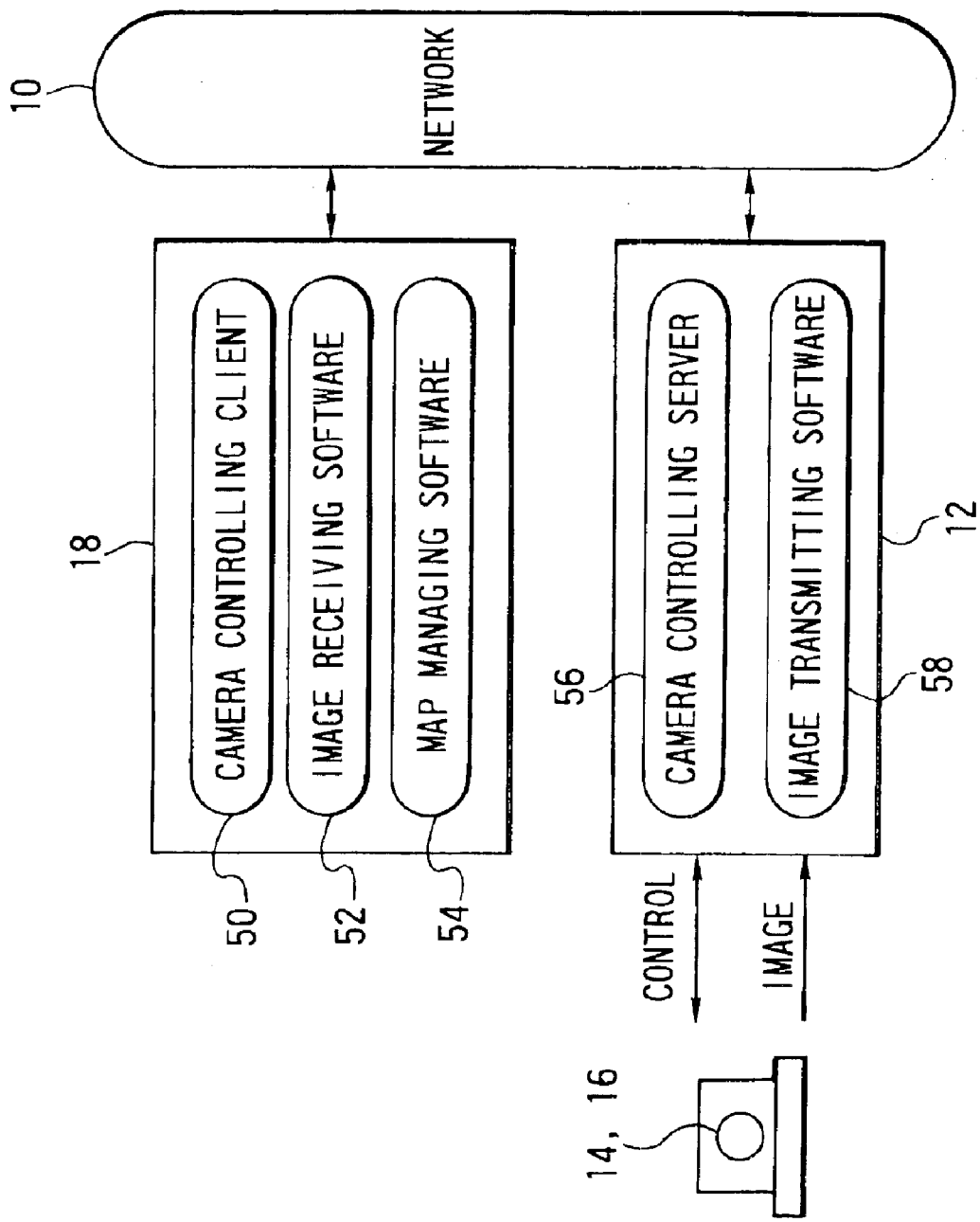
FIG. 4 is a block diagram showing the software arrangement of the camera control system.

FIG. 4 shows the software arrangement of the camera control system in the embodiment. Referring to FIG. 4, the image receiving terminal 18 is provided with a camera controlling client (software) 50, connected to the image transmitting terminal 12 through the network 10, for remotely controlling the camera 16, image receiving software 52 for expanding compressed image data received from the image transmitting terminal 12 and displaying the image on the image plane of the monitor, map managing software 54 for displaying the allocation and the current state of each camera 16 in a camera symbol on a map. The software is stored in the secondary storage device 128 of the image receiving terminal 18.

The image receiving software 52 is arranged to manage the cameras 16 connected to all of the image transmitting terminals connected to the network 10. The image receiving software 52 holds information on fixed matters and information on variable matters, such as the name of the camera 16, the host name of the computer to which the camera 16 is currently connected, various states of the camera 16 including panning, tilting and zooming, whether or not the camera 16 is controllable, which of the cameras 16 is being currently controlled, which of the cameras 16 is picking up an image currently on display etc. Such information is supplied to the camera control client 50 and the map managing software 54 to be used for updating the display of a camera symbol, etc.

The image transmitting terminal 12 includes a camera controlling server (software) 56 and image transmitting software 58, which are stored in the secondary storage device 28. The camera controlling server (software) 56 is arranged to control the camera 16 through the camera control device 14 in accordance with a request from the camera control client 50 and to send information on the current state of the camera 16 (on how the camera is now being used, etc.) to the source of request. The image transmitting software 58 is arranged to compress an image outputted from the camera 16 and to send the compressed image to the source of request in a prescribed form via the network 10.

Figure 5:
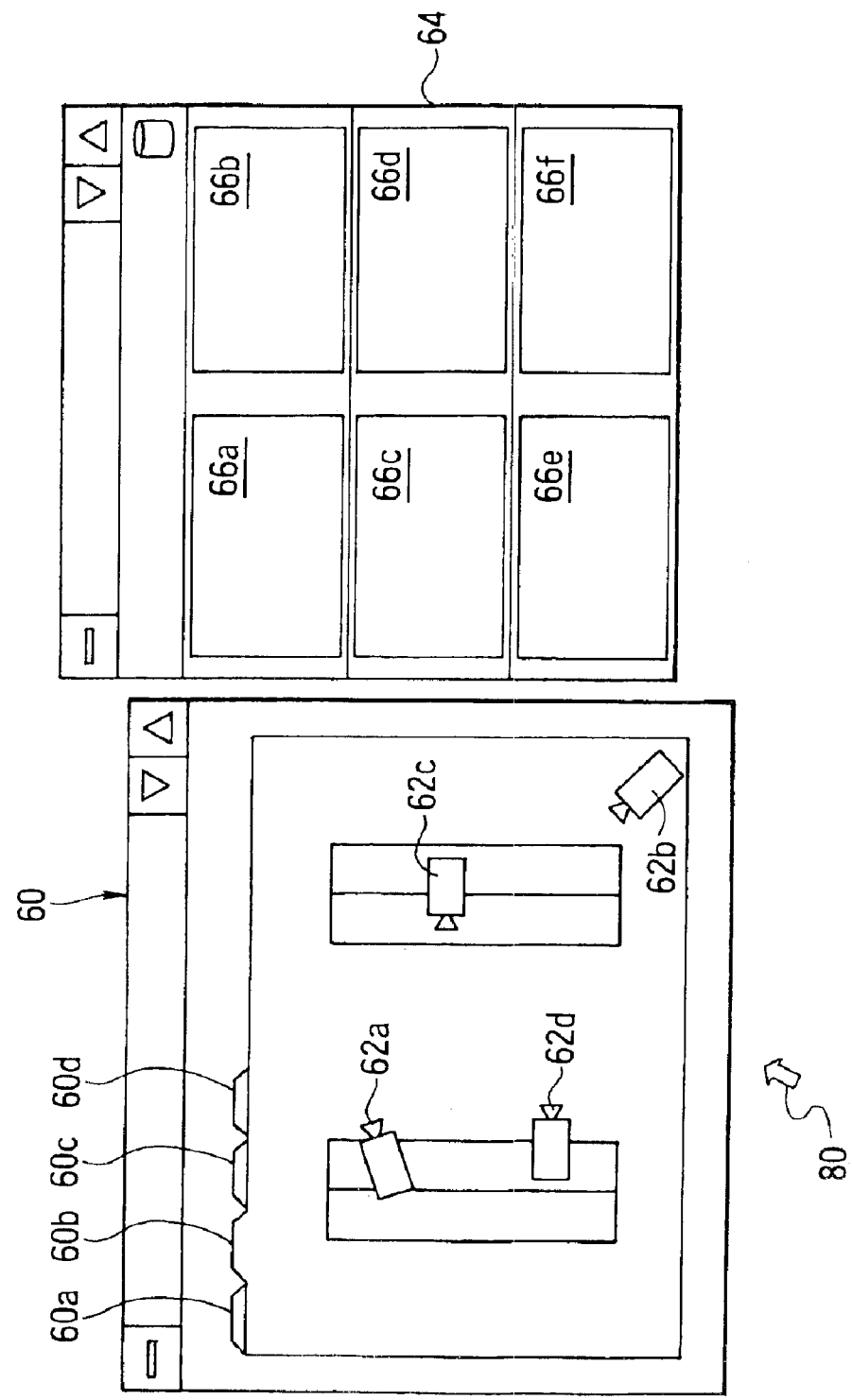
FIG. 5 shows by way of example a display made on a monitor image plane of an image receiving terminal 18.

FIG. 5 shows an example of the contents of a display made on an image plane of the monitor of the image receiving terminal 18. Referring to FIG. 5, reference numeral 60 denotes a map window which shows in each map a layout of office, stores, shops, warehouses, or the like, in which a plurality of cameras 16 are allocated. A plurality of maps 60a, 60c, 60c and 60d are arranged to be selectively used in the map window 60. The number of maps 60a, 60b, 60c, 60d, — that can be displayed on the map window 60 is not particularly limited, as it depends on the performance of the system.

Figure 6:
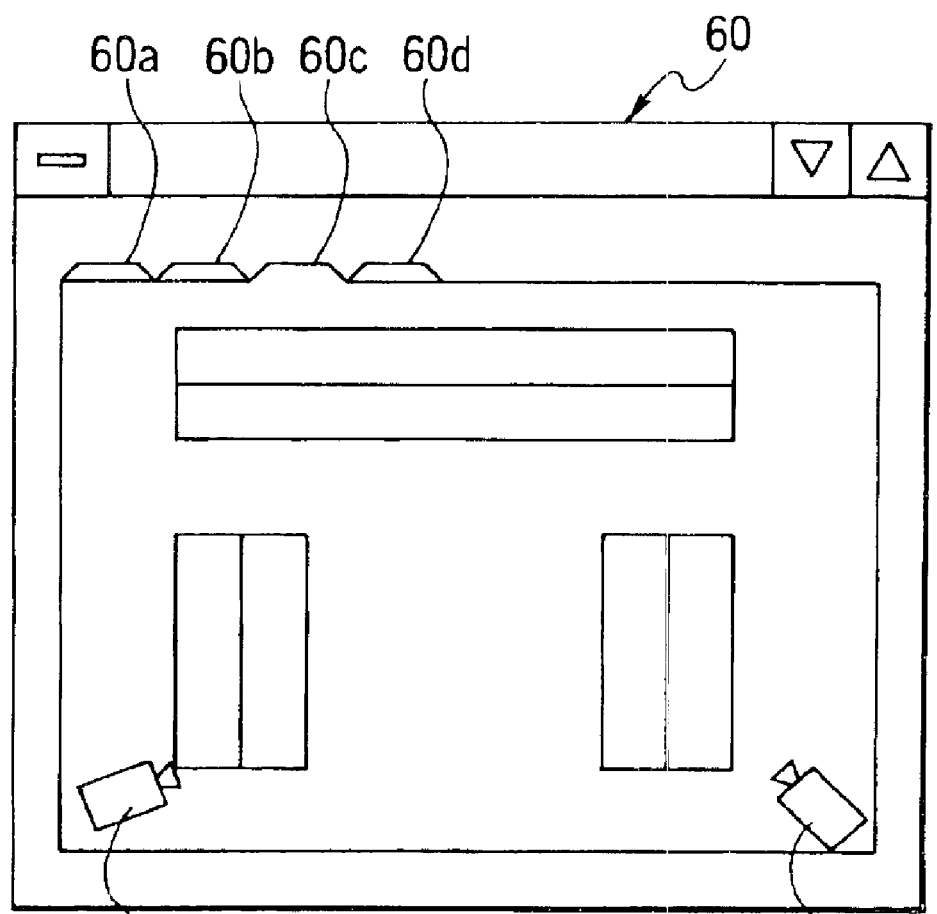
FIG. 6 shows another example of display made on the monitor image plane of the image receiving terminal 18.

Tags are attached respectively to the maps 60a, 60b, 60c and 60d as shown in FIG. 5. One of the maps can be selected by moving a cursor 80 with a mouse 151 and by clicking the mouse 151 at the tag of a desired map. Then, the selected map is displayed on the front side of the map window 60. In the case of FIG. 5, the map 60b is displayed in the front. In the map 60b, there are shown camera icons 62a, 62b, 62c and 62d which indicate the allocated cameras. If it is desired to change the display on the map window 60 to the map 60c, the tag of the map 60c is selected and the mouse 151 is clicked there. This causes the map 60c to be displayed as shown in FIG. 6, so that camera icons 62e and 62f which correspond to two allocated cameras are shown. These camera icons 62a, 62b, 62c, 62d, 62e and 62f are displayed respectively as being directed to the photo-taking directions of the corresponding cameras 16. FIG. 5 shows also an image display window 64 which is provided with image display areas 66a to 66f at which images picked up by the cameras 16 are respectively displayed.

The operation processes of the camera control system in the present embodiment are described below with reference to FIGS. 10, 11 and 12 which are flow charts. A program for control to be performed on the side of the image receiving terminal 18 is stored in the secondary storage device 128. In carrying out the program, the program is loaded on the main storage device 124 and is executed by the CPU 122. A program for control to be performed on the side of the image transmitting terminal 12 is stored in the secondary storage device 28. In carrying out the program, the program is loaded on the main storage device 24 and is executed by the CPU 22.

Figure 10:
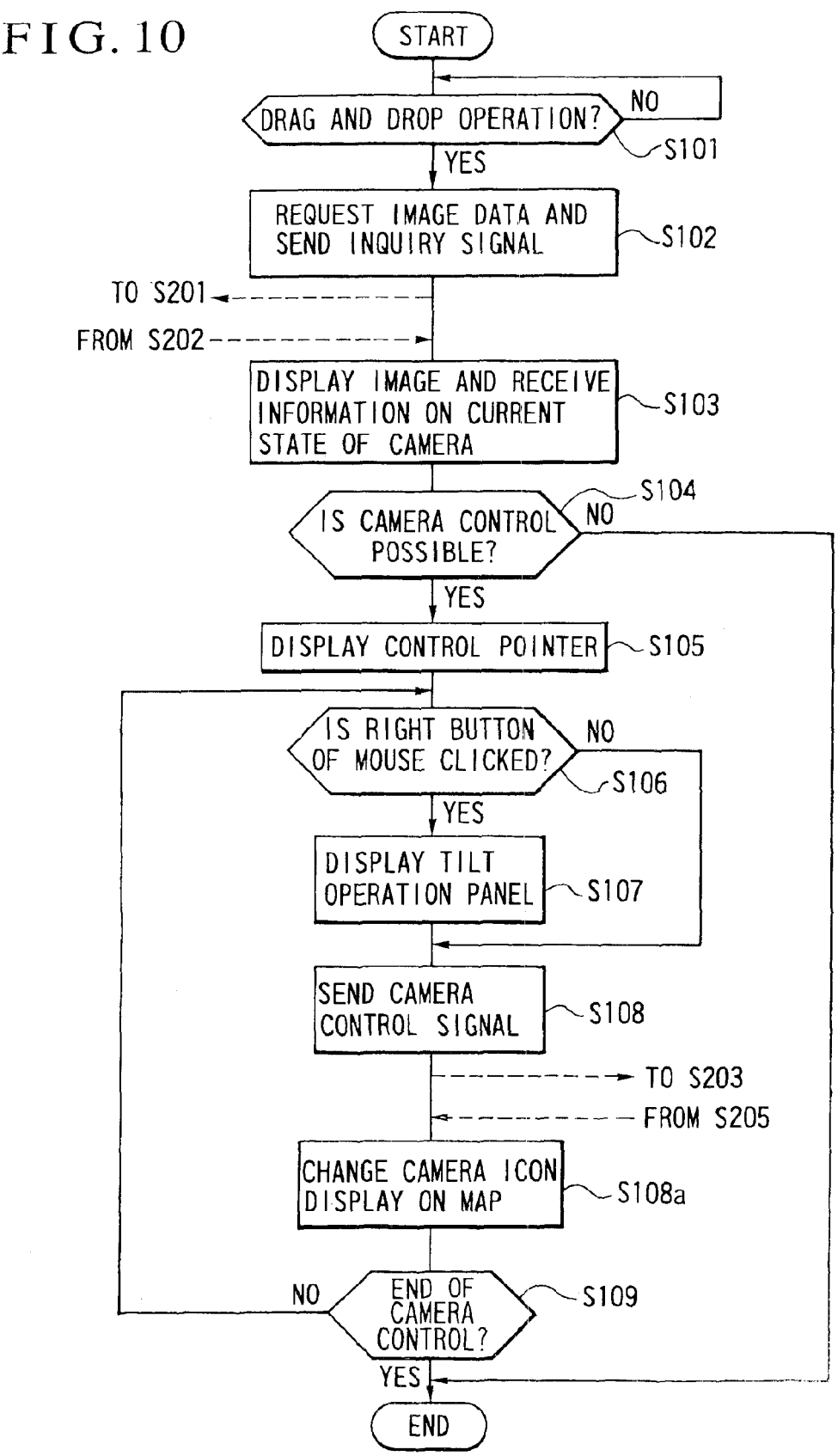
FIG. 10 is a flow chart showing a flow of operation processes of an image receiving terminal to be carried out in controlling a camera.

FIG. 10 is a flow chart showing the processes to be performed on the side of the image receiving terminal 18. At a step S101, when it is desired to display an image picked up by one of cameras 16, the camera icon 62 which represents the camera 16 is selected on an applicable map of the map window 60 by the user (operator). Then, the user performs a drag-and-drop operation with the mouse to drag, superimpose and drop the selected camera icon 62 on one of the image display areas 66a to 66f.

Figure 7:
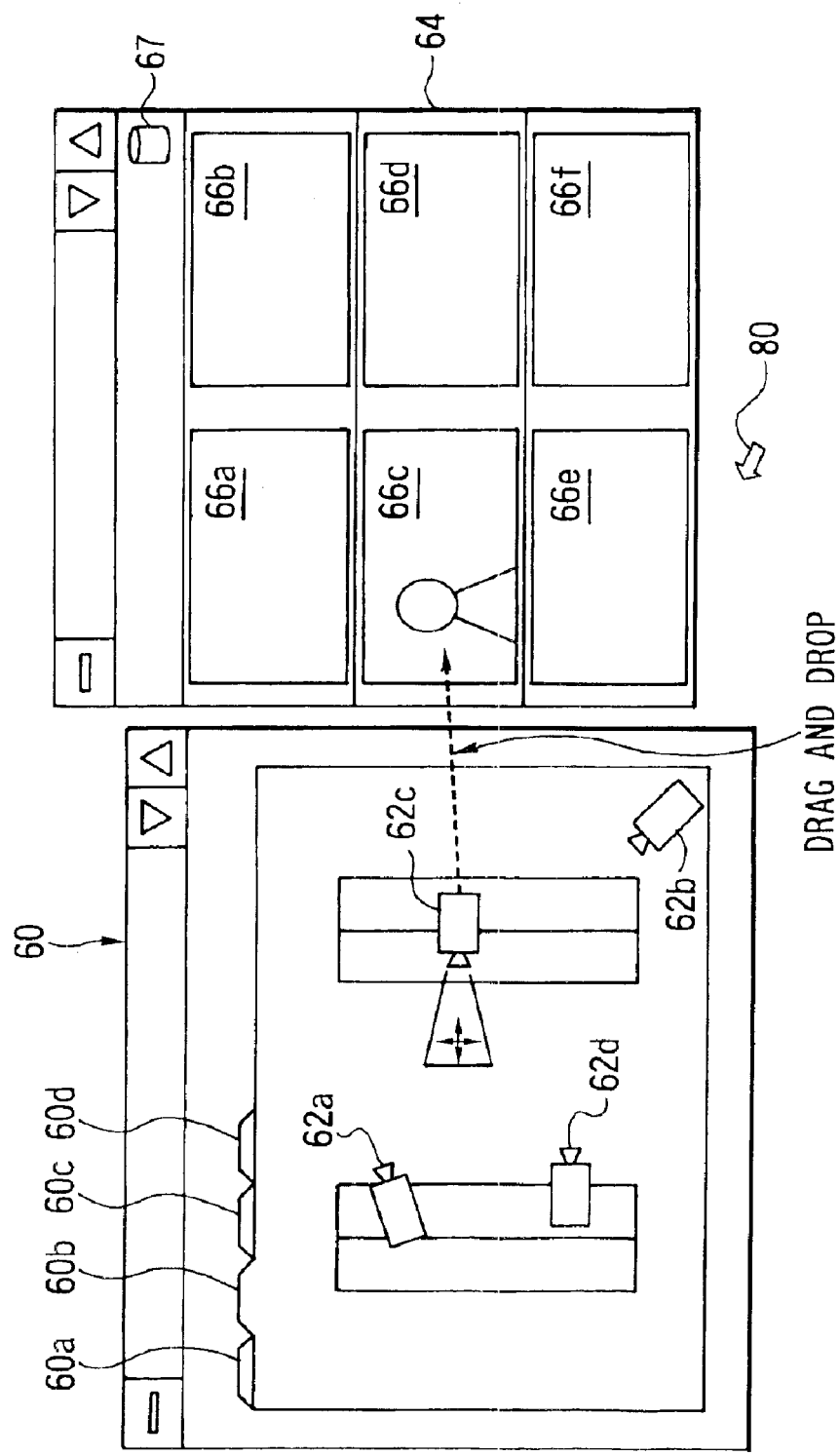
FIG. 7 shows a further example of display made on the monitor image plane of the image receiving terminal 18.
Figure 8:
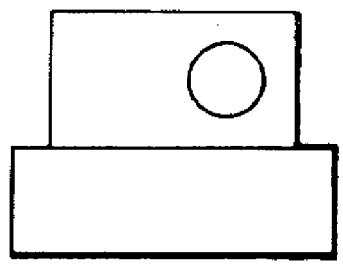
FIG. 8 shows by way of example a display of a camera icon in process of dragging.

For example, FIG. 7 shows a case where the camera icon 62c is dragged and dropped on the image display area 66c. In this case, an image picked up by the camera 16 which is represented by the camera icon 62c is displayed in the image display area 66c. Further, in the case of the embodiment, the display shape of the camera icon 62c is changed, while it is dragged, to show that the camera icon 62c is in process of dragging, as shown in FIG. 8.

At a step S102, when the above-stated action is performed, the camera controlling client 50 sends, to the camera server 56 of the image transmitting terminal 12 corresponding to the operated camera icon 62c, a request signal for image data and an inquiry signal as to whether this camera is controllable. The flow of operation then proceeds to a step S201 of FIG. 11.

Figure 11:
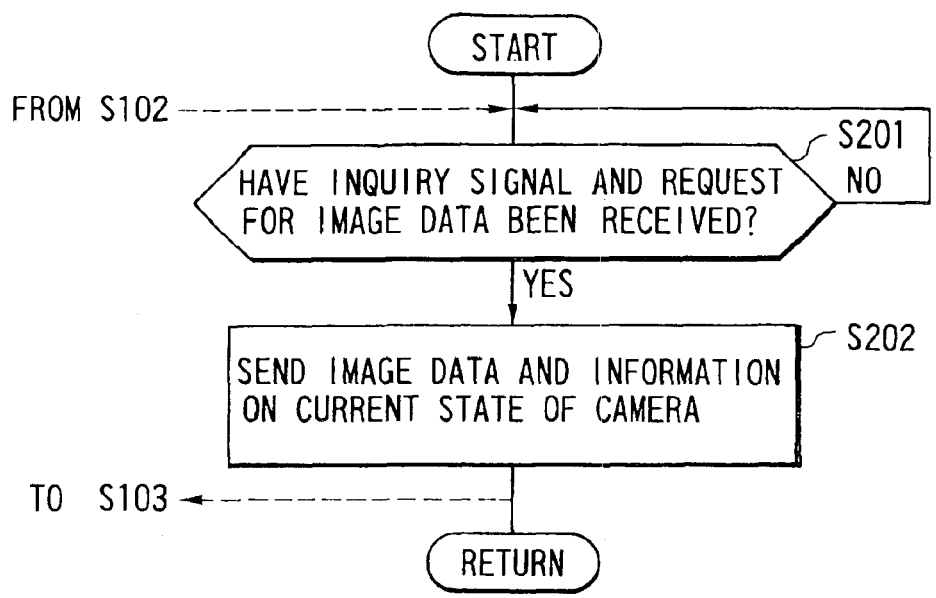
FIG. 11 is a flow chart showing a flow of operation processes of an image transmitting terminal to be carried out upon receipt of an inquiry signal.

FIG. 11 is a flow chart showing the operation processes to be performed on the side of the image transmitting terminal 12 when the request signal and the inquiry signal are received from the image receiving terminal 18. At the step S201 of FIG. 11, a check is made to find if the request signal and the inquiry signal are received. If so, the flow of operation proceeds to a step S202. At the step S202, the camera controlling server 56 of the image transmitting terminal 12 sends image data and information on the current stat of the camera 16, such as the current state of use of the camera 16 and the photo-taking direction of the camera 16, to the image receiving software 52 of the image receiving terminal 10. The flow then proceeds to a step S103 of FIG. 10.

Referring again to the flow chart of FIG. 10, at the step S103, the image receiving software 52 of the image receiving terminal 18 receives the information on the current state of the camera and image data from the image transmitting terminal 12. The image receiving software 52 then causes an image display to be made on the basis of the image data in the image display area 66 on which the camera icon 62 is dropped.

Figure 9:
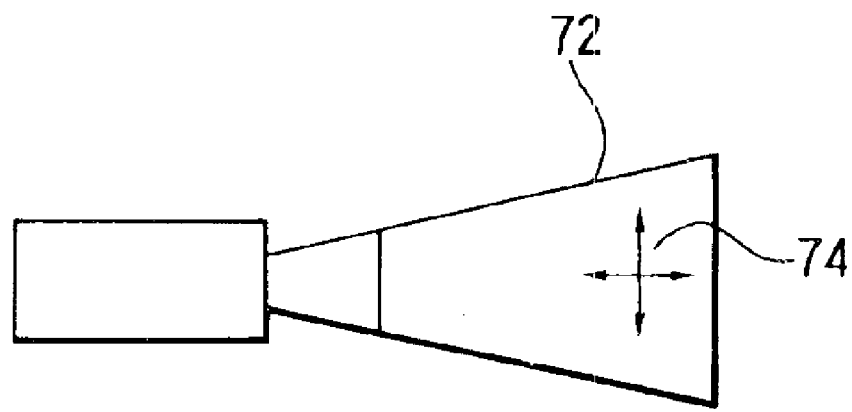
FIG. 9 shows by way of example a display of a camera icon which is controllable.

The map managing software 54 then adjusts the direction of the selected camera icon 62 to the shooting (photo-taking) direction of the applicable camera 16. In addition to that, a scope 72 is displayed for the selected camera icon 62, as shown in FIG. 9, to indicate that the image picked up by the camera is currently on display.

At the next step S104, a check is made to find if the camera is controllable. If so, the flow proceeds to a step S105 to display a control pointer 74 for control over a panning or zooming action within the scope 72. When the control pointer 74 is dragged with the mouse 151 (by operating the mouse 151 with the left side button of the mouse 151 kept in a clicked state), the camera controlling client 50 is enabled to perform control over the panning or zooming action according to the direction in which the dragging is performed.

At a step S106, which the camera judged to be controllable, a check is made to find it the right side button of the mouse 151 is clicked for the camera icon 62 while selection is in process. If so, the flow proceeds to a step S107. At the step S107, a tilt control panel 161 which is provided for tilt control, i.e., control over a tilting action, is displayed as shown in FIG. 13(*a*). The tilt control panel 161 may be displayed either in an adjacent position on one side of the right-button clicked camera icon 62 or at a position designated beforehand by the operator.

Referring to FIG. 13(*a*), a camera icon 163 in the tilt control panel 161 represents one side of the applicable camera 16. The camera icon 163 shows the camera 16 in a shooting state in the current tilting direction. A scroll bar 166 is displayed below the camera icon 163. The camera controlling client 50 is allowed to form a tilt control command by moving a knob 167 on the scroll bar 166 according to the direction in which the mouse 151 is dragged.

When the knob 167 of the scroll bar 166 is moved upward on the scroll bar 166 by the dragging operation on the mouse 151, the map managing software 54 causes the camera icon 163 in an interlocked manner to be displayed in an upward directed posture according to the dragging operation, as shown in FIG. 13(*b*). If the knob 167 of the scroll bar 166 is moved downward by the dragging operation, the camera icon 163 is displayed in a downward directed posture as shown in FIG. 13(*c*).

In FIGS. 13(*a*), 13(*b*) and 13(*c*), mark "XX" 164 represents an upper limit angle value of tilting, and mark "YY" 165 represents a lower limit angle value of tilting. These limit values either may be the angle values or may be replaced with some other suitable values. These values are obtained by sending, at the above-stated step S102, a request for tilting angle limiting positions of the camera 16 from the camera controlling client 50 through the network 10 to the camera controlling server 56 of the image transmitting terminal 12 to which the applicable camera 16 is connected.

Mark "nn" shown in the neighborhood of the knob 167 denotes the current tilt position in a numerical value. When the dragging operation is performed on the knob 167 of the scroll bar 166, this numerical value varies according to the movement of the knob 167. When the knob 167 reaches the upper limit of the scroll bar 166, the value of the mark "XX" 164 becomes equal to the numerical value of the scroll bar 166. Conversely, when the knob 167 reaches the lower limit of the scroll bar 166, the value of the mark "YY" 165 becomes equal to the numerical value of the scroll bar 166. The operator can perform tilting control to attain a desired position by watching this value.

It is also possible for the camera controlling client 50 to form a tilt control signal by dragging (by causing to move with a dragging operation on the mouse) the control pointer 162 within the scope of the camera icon 163 upward or downward. In this instance, the map managing software 54 causes the display shape of the camera icon 163 to be changed according to the controlled tilt shooting direction as shown in FIGS. 13(*a*), 13(*b*) and 13(*c*). Then, in association with this change, the display portion of the knob 167 of the scroll bar 166 is also changed accordingly. Further, in a case where the control pointer 162 is dragged to the right or to the left, the camera controlling client 50 forms a control instruction for a zoom magnification.

At a step S108, the camera control signal formed by the camera controlling client 50 through the above-stated process is sent to the image transmitting terminal 12. The flow then proceeds to a step S203 shown in FIG. 12. Further, in the case of the embodiment, the tilt control panel 162 is arranged to simultaneously display the camera icon 163 and the scroll bar 166 as shown in FIG. 13(*a*). However, it is also possible to carry out tilting control over the camera 16 by displaying only one of the camera icon 163 and the scroll bar 166. In such a modification, the camera controlling client 50 is arranged to form a tilting control signal also in the same manner as described above.

As mentioned in the foregoing, the map managing software 54 is arranged to always receive, from the image receiving software 52, information on changes (taking place in panning and tilting) of the camera 16 picking up an image currently on display even when control is impossible. In accordance with this information, the map managing software 54 changes the direction of the camera icon 62 to adjust it to the shooting direction of the camera 16 which picks up the image currently on display.

Further, the embodiment is arranged to permit the tilt control panel 161 to be displayed only when the camera is judged to be controllable. That arrangement, however, can be changed to permit the tilt control panel 161 to be displayed by clicking the right button of the mouse 151 even when the camera 16 is judged to be not controllable. This modification has an advantage in that the shooting direction in the tilting direction on display can be confirmed on the basis of information on the current state of the camera 16 obtained from on the side of the image transmitting terminal 12. In that instance, the control pointer 162 for the uncontrollable camera is not displayed.

Figure 12:
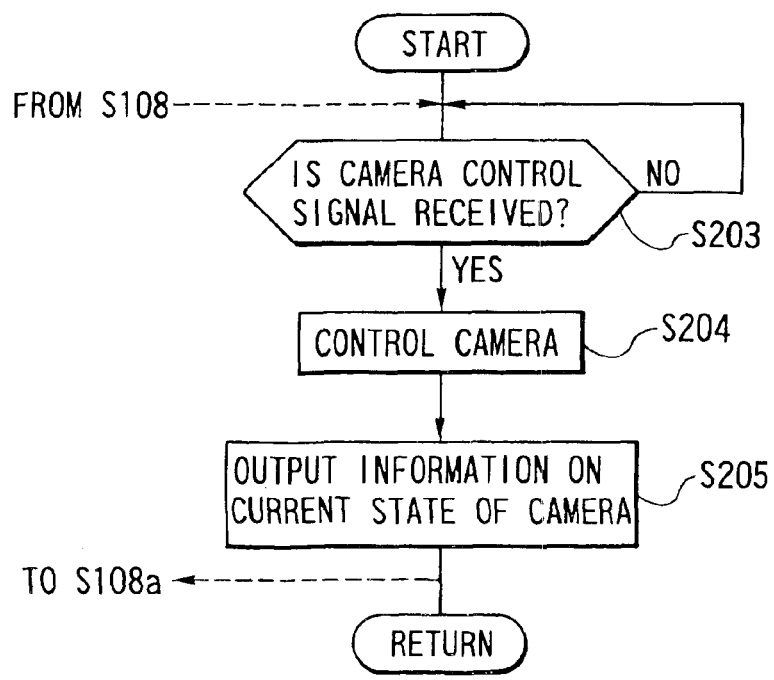
FIG. 12 is a flow chart showing a flow of operation processes of the image transmitting terminal to be carried out in controlling a camera.

FIG. 12 is a flow chart showing the operation processes to be carried out on the side of the image transmitting terminal 12 in controlling the camera 16. At the step S203 of FIG. 12, a check is made to find if the camera control signal is received from the image receiving terminal 18. If so, the flow proceeds to a step S204. At the step S204, the camera controlling server 56 controls the camera 16 on the basis of the camera control signal. At the next step S205, information on the current state of the camera 16 obtained through the control is sent to the map managing software 54 of the image receiving terminal 18. After that, the flow proceeds to a step S108a of FIG. 10.

Referring again to the flow chart of FIG. 10, at the step S108a, the shape of the camera icon 62 on the map window 60 is changed on the basis of the information on the current state of the camera 16 received from the camera controlling server 56. At the next step S109, a check is made to find if the control over the camera and the display of an image picked up by the camera are to be brought to an end. If so, a drag-and-drop operation is carried out to drag and bring the area 66 where the image is displayed to a trash can icon 67, as shown in FIG. 14.

In a case where images picked up by a plurality of cameras corresponding to camera icons 62 shown on a map are already displayed on the image display panel 64 and it is desired to change a camera to be controlled among the plurality of these cameras, the mouse 151 is operated to move the cursor 80 either to one of the camera icons 62 displayed on a map corresponding to the camera to be newly controlled or to one of the image display areas 66, and the left button of the mouse 151 is clicked.

For example, in a case where it is desired to change a controlling object from one of the cameras 16 which corresponds to the image display area 66c over to another camera which corresponds to the image display area 66a, the left button of the mouse 151 is clicked either at the image display area 66a or at the camera icon 62a. Then, the camera controlling client 50 sends an inquiry signal to the camera controlling server 56 of the image transmitting terminal 12 which corresponds to the selected camera icon 62 to inquire whether the camera 16 is controllable. In replay to the inquiry signal, the camera controlling server 56 sends to the image receiving terminal 18 information on the camera 16 which corresponds to the current image display area 66a as to whether it is controllable or not controllable because of some reason, such as that the camera is being controlled by some other operator. If the camera is judged to be controllable, the display position of the control pointer 74 is shifted from the camera icon 62c to the camera icon 62a.

In case where it is desired to control the tilt of the camera 16, the camera icon 62a is selected and the right button of the mouse 151 is clicked. Then, the tilt control panel 161 is displayed as shown in FIG. 13(a). The tilt control can be accomplished by performing a dragging operation on the control pointer 162 in the same manner as described in the foregoing.

As mentioned above, in a case where it is desired to perform a tilting operation on a camera icon displayed on a map, the tilt control panel 161 can be displayed by clicking the right button of the mouse 151 at the camera icon. Therefore, the shooting directions of each camera including the panning, tilting and zooming directions can be controlled at the same time while confirming on the map the shooting point of the camera under control. Further, in accordance with the invention, a camera control system thus can be arranged to permit simultaneous confirmation of the panned and tilted shooting directions of the camera.

The object of the invention can be attained also by providing a system or an apparatus with a storage medium on which software program codes are recorded for carrying out the functions of the embodiment described above. Then, a computer (or a CPU or an MPU) included in the system or the apparatus is arranged to read and execute the program codes stored in the storage medium.

In the above-stated case, the functions of the embodiment disclosed above can be carried out by the program codes read out from the storage medium. Then, the storage medium in which the program codes are stored can be considered to constitute the invention.

The storage medium to be used for supplying the above-stated program codes can be selected, for example, from among storage media such as a floppy disk, a hard disk, an optical disk, a magneto-optical disk, a CD-ROM, a CD-R, a magnetic tape, a nonvolatile memory card and a ROM.

Further, with the program codes read out executed by a computer, it is possible not only to allow the computer to carry out the functions of the embodiment disclosed but also allow an OS (operating system) working on the computer to execute a part of or all of actual processes of the functions.

Further, after the program codes read out from the storage medium are written into a function expanding board inserted in a computer or into a memory included in a function expanding unit connected to the computer, a part of or all of the actual processes of the program codes can be executed by a CPU or the like included in the function expending board or the function expanding unit. The functions of the embodiment disclosed can be carried out by such processes.

In a case where the arrangement of the embodiment disclosed is applied to the storage medium mentioned above, program codes corresponding to the flow charts described in the foregoing are to be stored in the storage medium. In short, modules indispensable to the camera control system according to the invention are stored in the storage medium.

The indispensable modules include at least "a tilt control panel display module" for tilt control over a camera corresponding to a camera icon displayed by superimposing it on a map and "a control module" for forming camera control commands by an operation on the tilt control panel. Program codes of these modules are stored in the storage medium.

According to the arrangement of the embodiment disclosed, a camera control system can be arranged to permit tilt control over each of video cameras by confirming the current position of the video camera through the camera icon which represents the video camera on a map window.

What is claimed is:

1. A camera control system for controlling an image pickup direction of a camera connected to said camera control system through a network, said camera control system comprising:

a map display control device adapted to display a map;

a first camera index indicative of a position of the camera in a state of being superimposed on the map and a second camera index on the map, indicative of a state of a current tilting direction of the camera in relation to the fist camera index by changing the shape of said second camera index without depending on a state of a current panning direction of the camera;

a tilting direction display control device adapted to display information on the current tilting direction of a camera which corresponds to a designated second camera index and information on the controllable range in the tilting direction of the camera in response to designating the second camera index, by using a scroll bar; and a communicating device adapted to receive an image picked up by the camera;

wherein said tilting direction display control device display the information of the current tilting direction of the camera and information on the controllable range in association with the change of shape of the second camera index.

2. A camera control system according to claim 1, wherein said communicating device outputs a command for, in response to designating the second camera index, enabling the tilting direction of a camera which corresponds to the designated second camera index, to be controlled.

3. A camera control system according to claim 1, wherein said second camera index is displayed in response to designating the first camera index.

4. A camera control system according to claim 1, wherein the second camera index is an icon, and indicates the state of the tilting direction of a camera which corresponds to said icon.

5. A camera control system according to claim 1, wherein said communicating device outputs a command for enabling the tilting direction of the camera to be controlled in response to designating and moving the index on the scroll bar.

6. A camera control system according to claim 5, wherein the second camera index indicates the tilting direction of the camera in association with movement of the index on the scroll bar.

7. A control method for a camera control system for controlling an image pickup direction of a camera connected to said camera control system through a network, said control method comprising:
  a map display step for displaying a map;
  a first camera index display step of displaying a first camera index indicative of a position of the camera in a state of being superimposed on the map; and
  a second camera index display step of displaying a second camera index on the map indicative of a state of a current tilting direction of the camera in relation to the first camera index by changing the shape of said second camera without depending on a state of a current passing direction of the camera;
  a displaying information display step of displaying information on the current tilting direction of a camera which corresponds to a designated second camera index and information on the controllable range in the tilting direction of the camera in response to designating the second camera index, by using a scroll bar; and
  wherein said displaying information display step displays the information of the current tilting direction of the camera and information on the controllable range in association with the change of shape of the second camera index.

8. A control method according to claim 7, further comprising a control step of, in response to designating the second camera index displayed by said second camera index display step, enabling the tilting direction of a camera which corresponds to the designated second camera index, to be controlled.

9. A control method according to claim 7, wherein said second camera index display step is arranged to display the second camera index in response to designating the first camera index.

10. A control method according to claim 7, wherein the second camera index displayed by said second camera index display step is an icon, and indicates the state of the tilting direction of a camera which corresponds to said icon.

11. A control method according to claim 7, wherein said control step is arranged to enable the tilting direction of the camera to be controlled in response to designating and moving the index displayed by said tilting direction display step.

12. A control method according to claim 11, wherein the second camera index displayed by said second camera index display step indicates the tilting direction of the camera in association with movement of the index displayed by said tilting direction display step.

13. A storage medium which stores therein a program for operating functions of a camera control system for controlling an image pickup direction of a camera connected to said camera control system through a network, said program comprising processes of:
  displaying a map;
  displaying a first camera index indicative of a position of the camera in a state of being superimposed on the map; and
  displaying a second camera index, on the map, indicative of a state of a current tilting direction of the camera in relation to the first camera index by changing the shape of said second camera index without depending on a state of a current panning direction of the camera;
  displaying information on the current tilting direction of a camera which corresponds to a designated second camera index and information on the controllable range in the tilting direction of the camera in response to designating the second camera index, by using a scroll bar; and
  wherein said displaying step displays the information of the current tilting direction of the camera and information on the controllable range in association with the change of shape of the second camera index.

14. A storage medium according to claim 13, wherein said program further comprises a process of, in response to designating the second camera index displayed, enabling the tilting direction of a camera which corresponds to the designated second camera index, to be controlled.

15. A storage medium according to claim 13, wherein said program further comprises a process of displaying the second camera index in response to designating the first camera index.

16. A storage medium according to claim 13, wherein said program further comprises a process of causing the displayed second camera index to indicate the tilting direction of a camera which corresponds to the second camera index.

17. A storage medium according to claim 13, wherein said program further comprises a process of enabling the tilting direction of the camera to be controlled in response to designating and moving the index displayed on the scroll bar.

18. A storage medium according to claim 17, wherein said program further comprises a process of causing the second camera index displayed to indicate the tilting direction of the camera in association with movement of the index displayed on the scroll bar.

19. A camera control system for controlling an image pickup direction of a camera connected to said camera control system through communication medium, said camera control system comprising:
  a camera index display control device adapted to display a camera index indicative of a state of a current tilting direction of the camera by changing the shape of said camera index;
  a tilting direction display control device adapted to display information on the current tilting direction of a camera which corresponds to a designated camera index and information on the controllable range in the tilting direction of the camera in association with the change of the shape of the designated camera index, in response to designating said camera index, by using a scroll bar separately formed from said camera index.

20. A camera control system according to claim 19, further comprising, a map display control device adapted to display a map and an icon indicative of the position of a camera on the map;

wherein said camera index display control device display the camera index, in accordance with designating the icon on the map.

21. A camera control system according to claim 19, wherein said tilting direction display control device display a numerical value of tilting direction, in accordance with the position of the scroll bar.

22. A camera control system according to claim 19, wherein the change of the shape of the designated camera index is implemented in accordance with the dragging a pointer on the camera index.

23. A camera control system according to claim 19, wherein said camera index display control device displays the camera index in association with the change of the position of the scroll bar.

24. A camera control method for a camera control system for controlling an image pickup direction of a camera connected to said camera control system through communication medium, said camera control method comprising:

a camera index display step of displaying a camera index indicative of a state of a current tilting direction of the camera by changing the shape of said camera index;

a displaying information display step of displaying information on the current tilting direction of a camera which corresponds to a designated camera index and information on the controllable range in the tilting direction of the camera in association with the change of the shape of the designated camera index, in response to designating said camera index, by using a scroll bar separately formed from said camera index.

25. A control method according to claim 24, further comprising, a control step of displaying a map and an icon indicative of the position of a camera on the map;

wherein said control step displays the camera index, in accordance with designating the icon on the map.

26. A control method according to claim 24, wherein said displaying information displaying step displays a numerical value of tilting direction, in accordance with the position of the scroll bar.

27. A control method according to claim 24, wherein the change of the shape of the designated camera index is implemented in accordance with the dragging a pointer on the camera index.

28. A camera control system according to claim 24, wherein said camera index display step displays the camera index in association with the change of the position of the scroll bar.

29. A storage medium which stores therein a program for operating functions of a control method for a camera control system for controlling an image pickup direction of a camera connected to said camera control system through communication medium, said program comprising processes of:

displaying a camera index indicative of a state of a current tilting direction of the camera by changing the shape of said camera index;

displaying information on the current tilting direction of a camera which corresponds to a designated camera index and information on the controllable range in the tilting direction of the camera in association with the change of the shape of the designated camera index, in response to designating said camera index, by using a scroll bar separately formed from said camera index.

30. A control method according to claim 29, further comprising, displaying a map and an icon indicative of the position of a camera on the map;

wherein said the camera index is displayed, in accordance with designating the icon on the map.

31. A control method according to claim 29, wherein said displaying information displays a numerical value of tilting direction, in accordance with the position of the scroll bar.

32. A control method according to claim 29, wherein the change of the shape of the designated camera index is implemented in accordance with the dragging a pointer on the camera index.

33. A camera control system according to claim 29, wherein said camera index display step displays the camera index in association with the change of the position of the scroll bar.

* * * * *

UNITED STATES PATENT AND TRADEMARK OFFICE
CERTIFICATE OF CORRECTION

PATENT NO. : 6,919,921 B1
APPLICATION NO. : 09/088217
DATED : July 19, 2005
INVENTOR(S) : Masayuki Morota et al.

It is certified that error appears in the above-identified patent and that said Letters Patent is hereby corrected as shown below:

Column 5,
Line 63, delete "60a, 60c, 60c" and insert -- 60a, 60b, 60c --.

Column 7,
Line 2, delete "terminal 10" and insert -- terminal 18 --.

Signed and Sealed this

Twenty-seventh Day of June, 2006

JON W. DUDAS
*Director of the United States Patent and Trademark Office*